United States Patent [19]

Towner

[11] 3,783,197

[45] Jan. 1, 1974

[54] DATA ACQUISITION AND RECORDING SYSTEMS

[75] Inventor: Frank Richard Towner, Wokingham, England

[73] Assignee: Sperry Rand Limited, London, England

[22] Filed: Aug. 24, 1971

[21] Appl. No.: 174,344

[30] Foreign Application Priority Data

Aug. 26, 1970 Great Britain .................. 41,019/70

[52] U.S. Cl.... 179/100.2 Z, 179/100.2 R, 242/197, 274/4 D

[51] Int. Cl. ...................... G11b 23/04, G11b 15/18

[58] Field of Search ........... 179/100.2 Z, 100.2 MD, 179/100.2 R; 242/197, 198, 55.19 A; 274/4 C, 4 D, 4 E

[56] References Cited

UNITED STATES PATENTS

| | | | |
|---|---|---|---|
| 3,644,684 | 2/1972 | Tsuji | 179/100.2 Z |
| 3,327,067 | 6/1967 | Boniface | 179/100.2 Z |
| 3,614,009 | 10/1971 | Ramult | 179/100.2 Z |
| 3,549,823 | 12/1970 | Pastor | 179/100.2 Z |
| 3,273,896 | 9/1966 | Maeder | 179/100.2 Z |

*Primary Examiner*—Vincent P. Canney
*Assistant Examiner*—Alfred H. Eddleman
*Attorney*—S. C. Yeaton

[57] ABSTRACT

A compact flight data acquisition and recording system is disclosed in which a recorder unit is detachable from the remainder of the system. The recorder unit comprises a casing in which is mounted a tape deck and drive means for the tape deck is mounted externally of the recorder unit and is disconnectible from the tape deck when the recorder is detached from the system.

10 Claims, 8 Drawing Figures

DATA ACQUISITION AND RECORDING SYSTEMS

This invention relates to flight data acquisition and recording systems and is more particularly concerned with recorders for such systems.

The fundamental function of a flight data or "crash" recorder is, of course, reliably to record data fed to it so that the data can be read back when required. This presents no great problems but when it is desired continually to record flight data over a considerable period of time, difficulties arise in that if a length of magnetic recording tape is provided sufficient for the time period involved, the resulting bulk and weight thereof often cannot be accommodated in the space available. To overcome this difficulty, recycling recorders have been produced in which a fixed length of tape is cycled from one spool to another with data being recorded alternately in one direction of movement of the tape and then the opposite direction, previously-recorded data being erased before new data is recorded.

Recycling recorders can thus record, and have available for reading, the most-recently-recorded flight data, and with the use of a plurality of tracks on the tape, data recorded over say the previous twenty-four hours is typically available at any given instant. However, difficulties arise in the physical recycling of the tape from one spool to another, particularly when the spools are co-axially arranged, and also in the provision either of multiple heads for the multiple tracks or a single head movable from one track to another. Over a period of years the various solutions to the above problems have resulted in a comparatively complex recorder which is thus expensive and often difficult to reduce in overall size and weight which is a continual requirement of aircraft manufacturers.

The main object of the invention is to provide a flight data acquisition and recording system which is compact, and a recorder which is of a simple yet robust construction whereby it meets the stringent specification laid down regarding survival under crash or accident conditions.

According to one aspect of the present invention there is provided a flight data acquisition and recording system having a recorder unit which is detachable from the remainder of the system and comprises a casing in which is mounted a tape deck, drive means for the tape deck being provided externally of the recorder unit and being disconnectible from the tape deck when the recorder unit is detached from the system.

Thus the drive means, a major source of heat, is removed from the recorder unit with two important resulting advantages. The first is that the normal operating temperature within the recorder unit is lower than it would otherwise be whereby the unit can tolerate a greater external rise in temperature before the internal temperature reaches a dangerous level. The second is that the recorder can be used with replay equipment having drive means capable of a much faster replay speed than the recording speed so that time is saved during replay.

The drive means for the recorder unit may comprise a motor arranged to drive a belt, and a pulley associated with the tape deck and disposed on the outside of the casing of the recorder unit for engagement with the belt when the unit is correctly positioned in the system. The pulley may be attached to a shaft which extends through the casing to the tape deck.

Conveniently, the drive belt extends around three pulleys one of which is mounted on a pivoted arm which moves in one direction on engagement of the pulley on the recorder unit casing with the belt, and in the opposite direction on disengagement of the latter, whereby sufficient tension is maintained in the belt to prevent it from slipping from its three pulleys. Preferably, the arm is counterbalanced whereby spasmodic fluctuations in the drive which can result in spurious signals being recorded on the tape, such signals being known as "wow" and "flutter", are minimised. The use of a belt having elasticity also assists in the minimising of wow and flutter.

The wiring for the recorder unit may be taken to a multi-pin plug mounted on the casing and co-operable with a corresponding socket in the remainder of the system. Thus the recorder unit is mechanically and electrically detachable from the recorder system for playback, for example, and a replacement unit can readily be fitted if desired.

According to another aspect of the invention there is provided a flight data recorder unit comprising two spools which in use alternately receive and relinquish a recycling length of magnetic tape, the spools being mounted co-axially and means being provided to guide the tape from one spool to another, and vice-versa, while maintaining the plane of the tape at any given point, substantially parallel with the axis of the spools.

The means for guiding the tape from spool to spool may be in the form of a series of rollers at least two of which are non-cylindrical and serve to move the tape from the plane of one spool to the plane of the other spool. If each roller is of metal, then in conditions of high humidity and low temperature, the friction between the tape and the rollers is reduced to such an extent that the tape tends to slip off the rollers. Therefore, according to a preferred feature of the invention, the means for guiding the tape from spool to spool are in the form of a series of barrel rollers part or all of the surfaces of which are composed of a material having a relatively high coefficient of friction and/or low coefficient of thermal conductivity. In the case of part of the surfaces of the barrel rollers being composed of such a material, it is preferred to provide a central and peripheral recess in each roller and to insert therein an O-ring, for example, of the material. A suitable material has been found to be nylon.

The recorder unit may have the facility for recording data on a plurality of tracks on the recording medium in which case it may be provided with two potentiometric devices, one for indicating the position or footage of the tape, and the other for indicating which track is being recorded on or read from.

Conveniently said other potentiometric device comprises a wafer-type rotary switch which indexes the various heads of the recorder according to which track is to be used, resistors being connected in series between track positions whereby an analogue indication of the track in use at any instant is provided.

Three heads may be employed in the recorder unit, one head for recording data, one for monitoring recorded data, and the third for erasing previously-recorded data. With this arrangement, it is virtually impossible for an undetected fault to occur in recording. In known arrangements utilising two heads, for example, it is possible for a fault to exist without being detected until playback because one head is used for saturation recording thereby removing previously-recorded data, and the other head is used for monitoring. Thus failure in recording signals would be undetected as the monitor head is unable to distinguish between new and previously-recorded data.

With the use of a tape as the recording medium, the tape is preferably connectible to spool by means of a member which projects from the tape and is co-operable with a corresponding aperture in the spool. Conveniently, the projecting member is in the form of a rod or bar which may be inclined with respect to an axis normal to the plane of the part of the surface of the tape to which it is secured.

A flight data acquisition and recording system embodying the invention will now be described in greater detail, by way of example, with reference to the accompahying darwings, in which.

Figure 1:
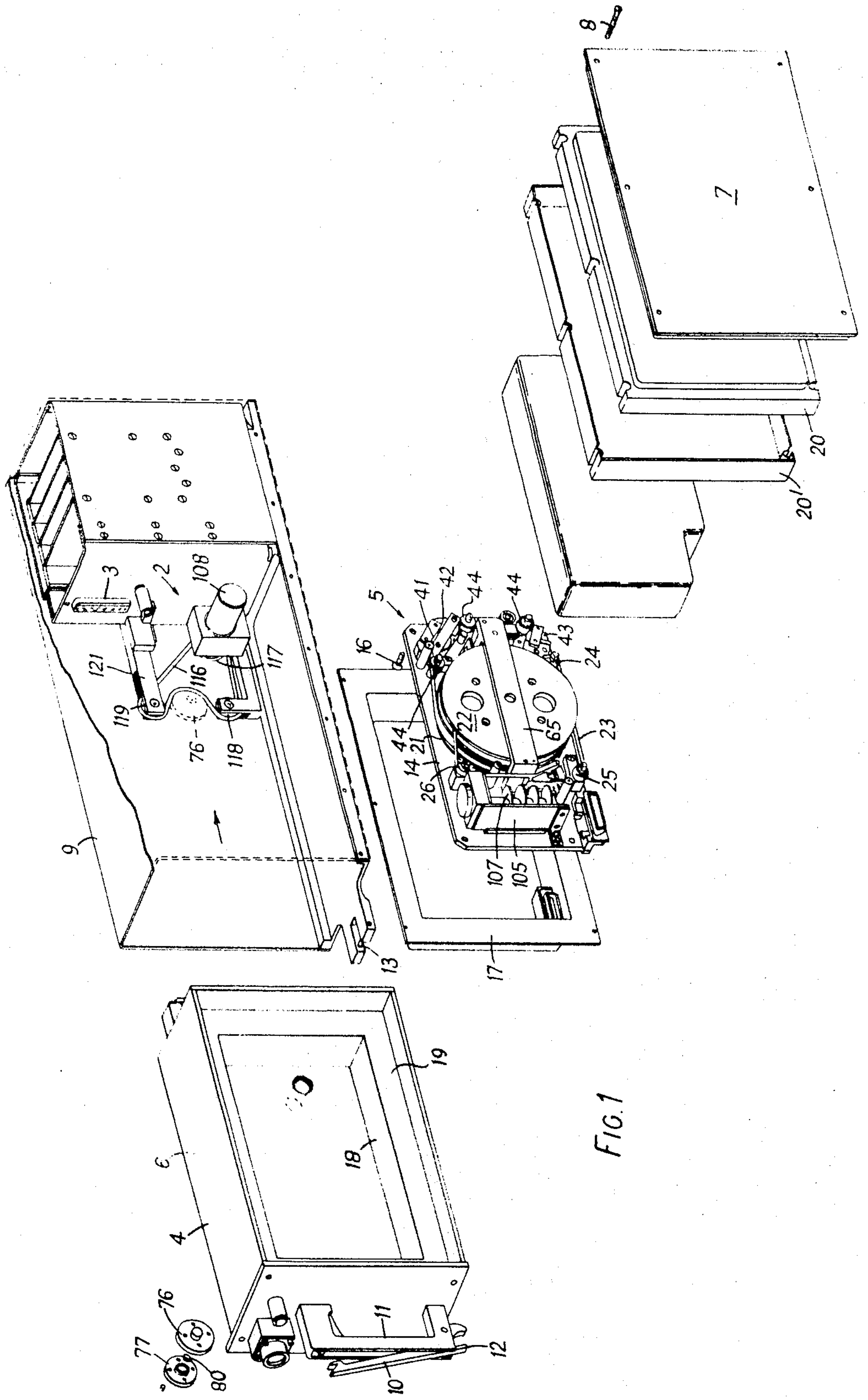
FIG. 1 shows an exploded perspective view of part of the system.

The system comprises a recycling recorder unit 1 which is mechanically and electrically detachable from the remainder of the system, only part of which is shown. This part includes drive means 2 for the recorder unit 1 and a multi-pin socket 3 to which are connected various electrical inputs to and outputs from the unit 1. The latter comprises a casing 4 in which is mounted a tape deck 5, the casing having a base 6 and a lid 7, the latter being secured by screws 8. The casing 4 is secured in a housing 9 by a locking lever 10 associated with a handle 11 and having a bifurcated extension 12 at one end which co-operates with a bar 13 on the base of the housing 9 which is in fact part of the standard packing provided in aircraft, the dimensions of the casing being chosen accordingly. The locking lever 10 has an off-set pivot so that the lever goes over-centre in the operative position securely to lock the casing 4 in position. The tape deck 5 has a base 14 and a protective cover 15 cast from stainless steel, the cover being secured in position by screws 16 passing from the underside of the base 14 into tapped bosses (not shown) cast into the underside of the cover. The base 14 sits in a groove 14' milled into the edge of the cover 15. This arrangement provides a very efficient protection for the tape deck in addition to the similar protection accorded by the casing 4.

The tape deck 5 sits in a thin shell 17 of a heat insulating material and this shell sits in a complementary recess 18 in a further and thicker shell 19, also of heat insulating material, provided in the casing 4. A suitably shaped pad 20 of heat insulating material is provided for the inside of the lid 7, the pad being retained by a polycarbonate shell 20'. Thus the tape deck is also efficiently heat insulated as well as physically protected. Nevertheless, it will be noted that in order to gain access to the tape deck 5 it is only necessary to release the locking lever 10, withdraw the unit 1 from the housing 9, release the screws 8 securing the lid 7, and finally the screws 16 securing the cover 15.

Figure 2:
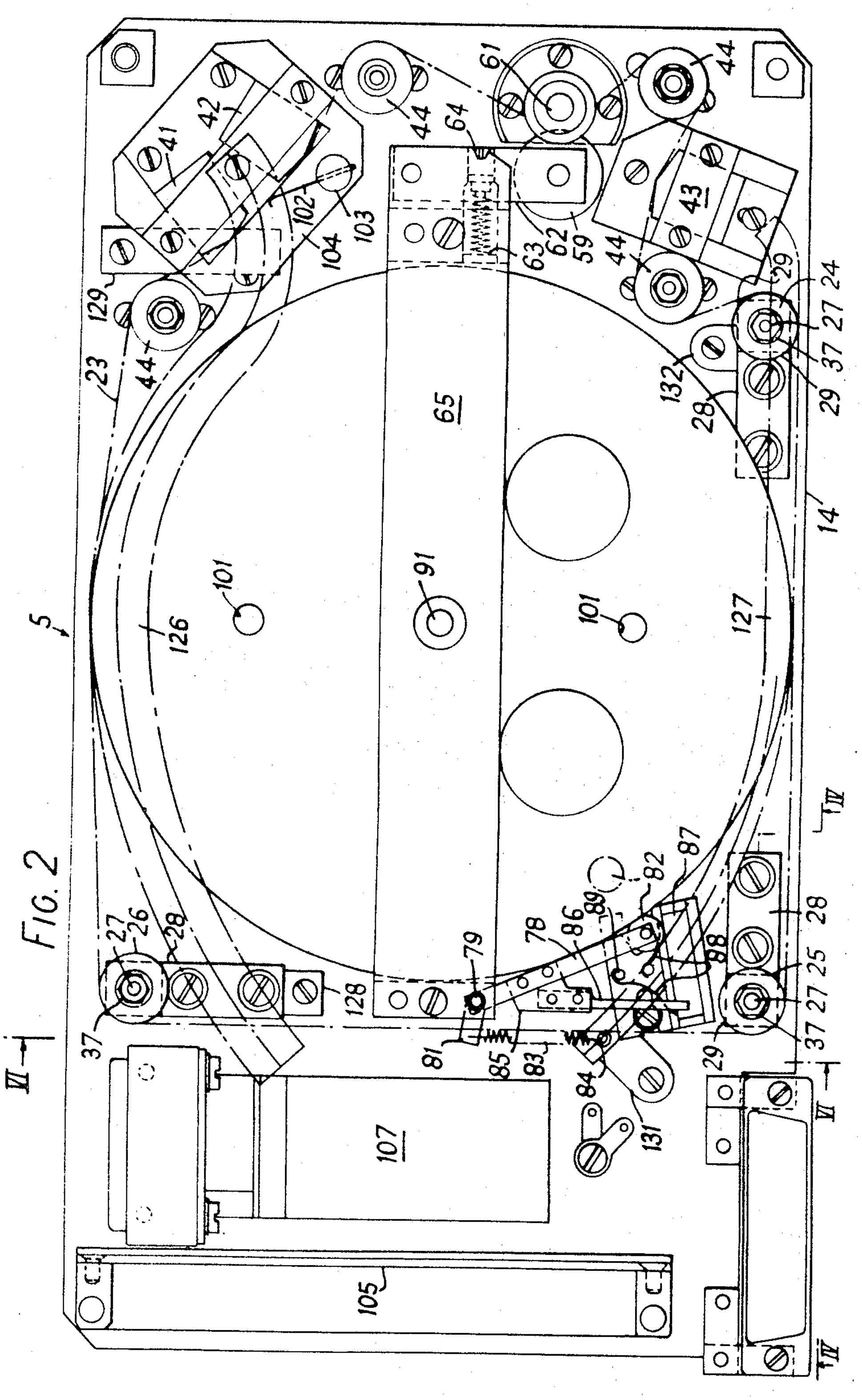
FIG. 2 is a plan view of the tape deck of the recorder unit of the system.
Figure 6:
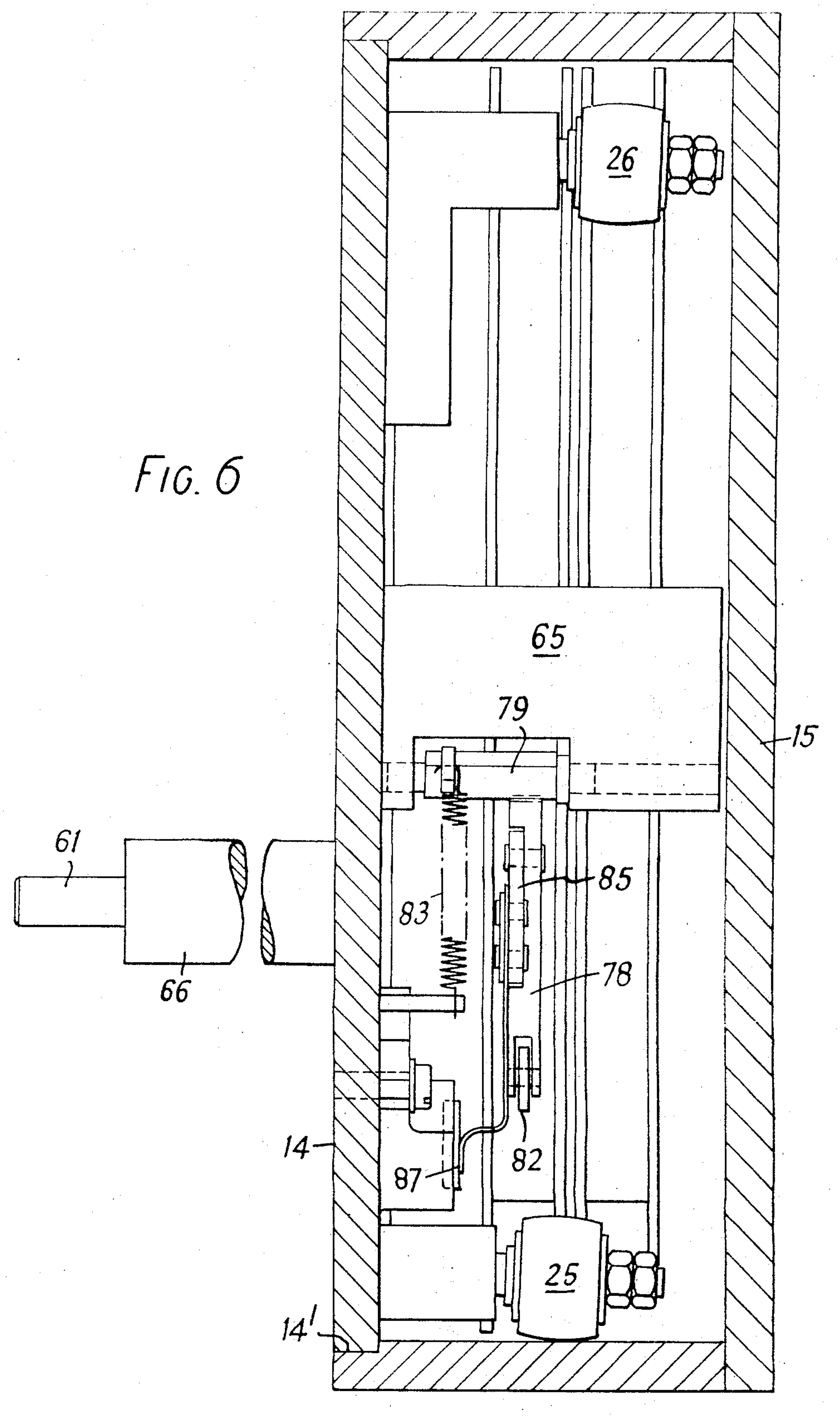
FIG. 6 is a section on line VI—VI of FIG. 2.

Referring more specifically to FIGS. 2 and 6, two co-axial aluminium spools 21, 22, between which a magnetic tape 23 is recycled, are mounted on the tape deck base 14. The tape 23 is guided from spool to spool by three barrel rollers 24, 25 and 26 mounted on respective posts 27 secured to plates 28 which are attached to the base 14. Each plate 28 has a boss 29 provided with a threaded bore 31 which receives a screwed end 32 of the associated post 27. The screwed end 32 of each post 27 is of reduced diameter and the flange 29 is counterbored at 33 to receive the main body of the post, the height of the roller being adjustable by turning the post 27 with locking in the desired position effected by a nut 34. Each post 27 has a flange 35 on which sits one of a pair of bearings 36 for the roller which is made of nylon. It is found that this material overcomes the problem of tape slip under conditions of high humidity and low temperature. Each roller 24, 25 and 26 is secured on its post 27 by two nuts 37. The rollers, 24, 25 and 26 guide the tape 23 from spool 21 to spool 22 and vice versa which involves moving the tape from one plane to another. This movement is effected without imparting any twist to the tape so that the plane of the latter at any given point remains generally parallel to the axis of the spools 21, 22, which is desirable from the point of view of avoiding creases in the tape which adversely affect the recording and reading of data. In order to effect this guiding of the tape 23, the rollers 24, 25 and 26 have to be set at angles with respect to the case 19; the roller 24 is inclined to the right as seen in FIG. 2, the roller 25 at a compound angle, i.e. to the right and downwardly, and the roller 26 downwardly. The setting of the rollers 24, 25 and 26 is effected by suitably angling the bore 31 and counterbore 33 in each flange 29 of the plates 28. The surface 38 of each plate 28 is then machined at right angles to the flange 29.

In an alternative arrangement, the post may be mounted at right angles to the plates 28 with the under sides of the plates at a suitable angle to give the desired inclination of the posts with respect to the tape deck base 14.

Figure 5:
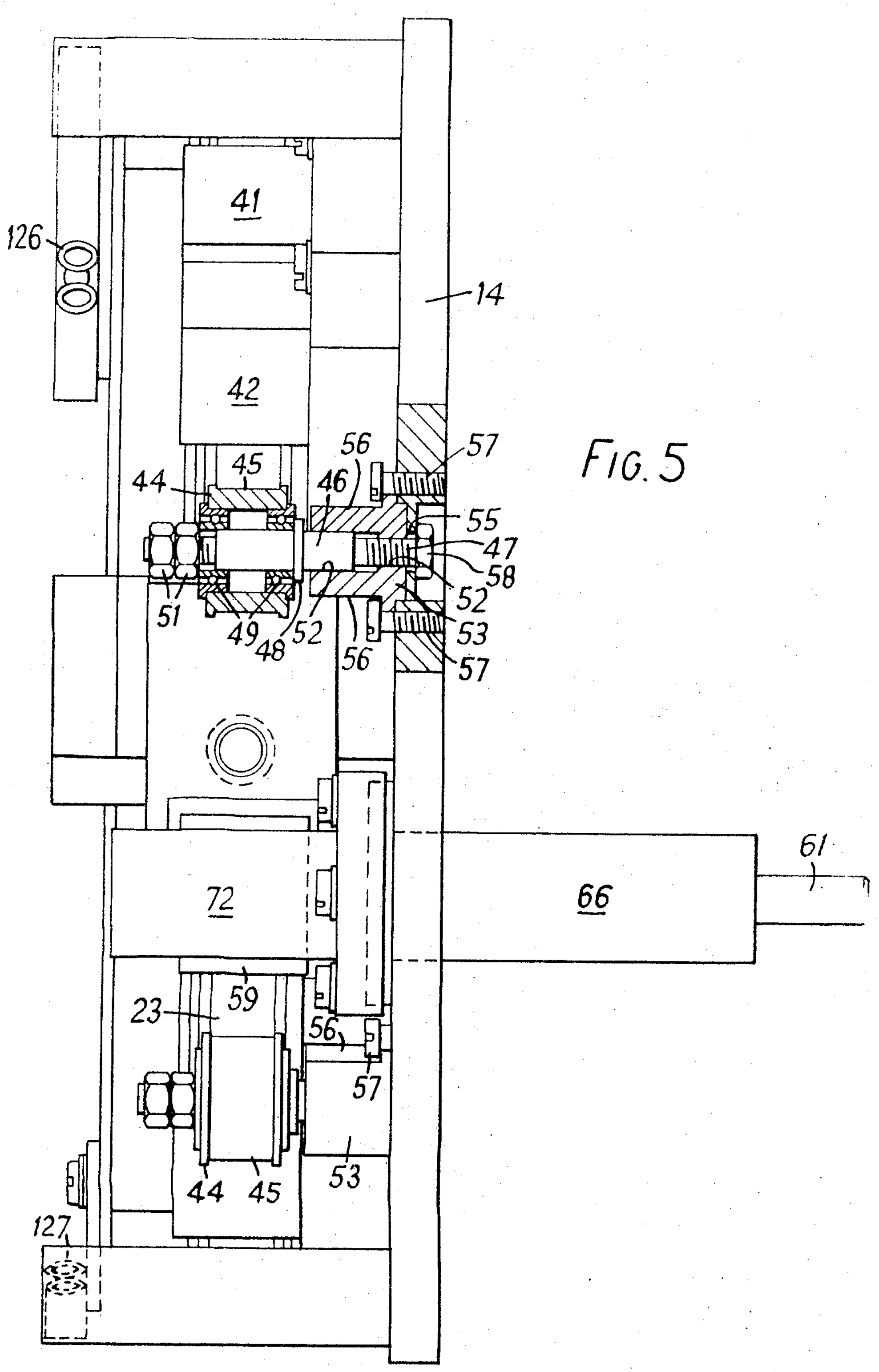
FIG. 5 is a section on line V—V of FIG. 2.

Three magnetic heads 41, 42, and 43 are provided, the first for erasing, the second for writing or recording and the third for monitoring recorded data, in a clockwise movement of the tape 23 as seen in FIG. 2. In the opposite direction of movement, the head 41 is switched to monitor, and the head 43 to erase. With this arrangement it is virtually impossible for a failure in erase, record or monitor current to occur undetected whereby satisfactory recording of data is ensured. The heads 41, 42 and 43 each in fact comprise a block of six heads, one for each of six tracks on the tape 23 and the latter is guided over the heads by four rollers 44. As seen more clearly in FIG. 5, the height of each roller 44 is adjustable, this being necessary in order to be able accurately to position the tape 23 with respect to the heads 41, 42 and 43. Each roller 44 is of aluminium and has a recessed surface 45 which is vapour blasted to reduce tape slip. The roller is mounted on a post 46 similar to the posts 27 of the rollers 24, 25 and 26 inasmuch as it has a screwed end 47 and a flange 48 on which sits one of a pair of bearings 49. The bearings 49 are secured in position by two nuts 51 and the screwed end 47 of the post is received in a threaded bore 52 of a cylindrical block 53. The latter is counterbored at 54 to receive the main body of the post 46, and the end 47 of the post 46 projects through a bore 55 in the base 14. The bore 55 is counterbored from both ends, one of the counterbores receiving one end of the associated block 53 having a reduced diameter. The block 53 has two diametrically-opposed arcuate recesses 56 formed therein whereby it can be secured in position on the base 14 by screws 57. This attachment of the block 53 to the base 14 is merely to facilitate initial assembly and the screws 57 can be dispensed with once the post 46 has been screwed into the block 53, adjusted for height and locked by a nut 58. The tape 23 is driven by a pinch roller 59 which is driven in turn by a shaft 61. The pinch roller 59 is mounted on one end of an arm 62 (FIG. 2) which is loaded by a spring 63 so as to urge the pinch roller into engagement with the tape 23, the spring being adjustable by a screw 64. The other end of the arm 62 is pivotally attached to the forked end of a strap 65 which retains the spools 21, 22 in position. The spring 63 acts between the strap 65 and the arm 62.

The shaft 61 is composed of a material known as FEROBESTOS which is asbestos impregnated with a silicon resin. This material is used because it is remarkably stable even at high temperatures which is desirable in order to exclude hydraulic and other corrosive fluids from the tape deck 5 during crash or accident conditions, for example, such fluids acting to destroy the magnetic tape 23 and hence data recorded thereon. This is an important point having regard to the fact that the shaft 61 extends through the base 6 of the casing 4. In fact, FEROBESTOS has the property of leaving a residue that will expand slightly at high temperatures (say 600° – 1,000°C) so that the shaft 61 is self-sealing under such conditions.

The shaft 61 is journalled in a sleeve 66 of FEROBESTOS by two bearings 67, 68 and is also sealed in the sleeve by an O-ring 69 which prevents ingress of corrosive or other fluids to the tape deck 5. The inner end of the shaft 61 is mounted in a bearing 71 provided in a sleeve 72. Both the sleeves 66 and 72 have flanges 73, 74, respectively, by which they are bolted to the base 14 of the tape deck 5. A hard chromium plated brass sleeve 75 is provided on the inner end of the shaft 61 as a tight push fit, the diameter of the sleeve 75 being chosen so as to drive the tape 23 a required distance per revolution of the shaft 61. The sleeve 75 is hard chromium plated brass in order to overcome the problem of magnetic remnance which other materials, such as stainless steel, exhibit and which causes noise and signal distortion. The end of the shaft 61 which projects from the sleeve 66 receives a pulley 76 (FIG. 1) which is detachable from the shaft to enable the tape deck 5 to be withdrawn from the casing 4. The pulley 76 is outside the casing 4 and is secured on the shaft 61 by a disc 77 and a sealing ring 80 which is forced into frictional engagement with the shaft when the disc and pulley are bolted together.

The strap 65 which holds the spools 21, 22 in position on the base 14 is U-shaped and carries an arm 78 (FIG. 2) at the end opposite to that carrying the arm 62. The arm 78 is connected at one end to a pivot 79 to which is also connected a second arm 81 disposed at an angle to the arm 78. A nylon roller 82 is attached to the other end of the arm 78 and is urged into engagement with the tape on the spool 21 by a spring 83 acting between the free end of the arm 81 and a post 84 mounted on the base 14. A piece of electrically-insulating material 85 is secured to the arm 78 and has secured to it a further arm 86 of beryllium copper which constitutes the moving contact or wiper of a potentiometer 87. As the arm 78 moves about its pivot according to the amount of tape wound on the spool 21, so the wiper 86 moves whereby an indication is provided as to the footage or recording position of the tape 23 at any given instant. The ends of the potentiometer 87 are connected via contacts 88 to terminals 89.

Figures 3, 4:
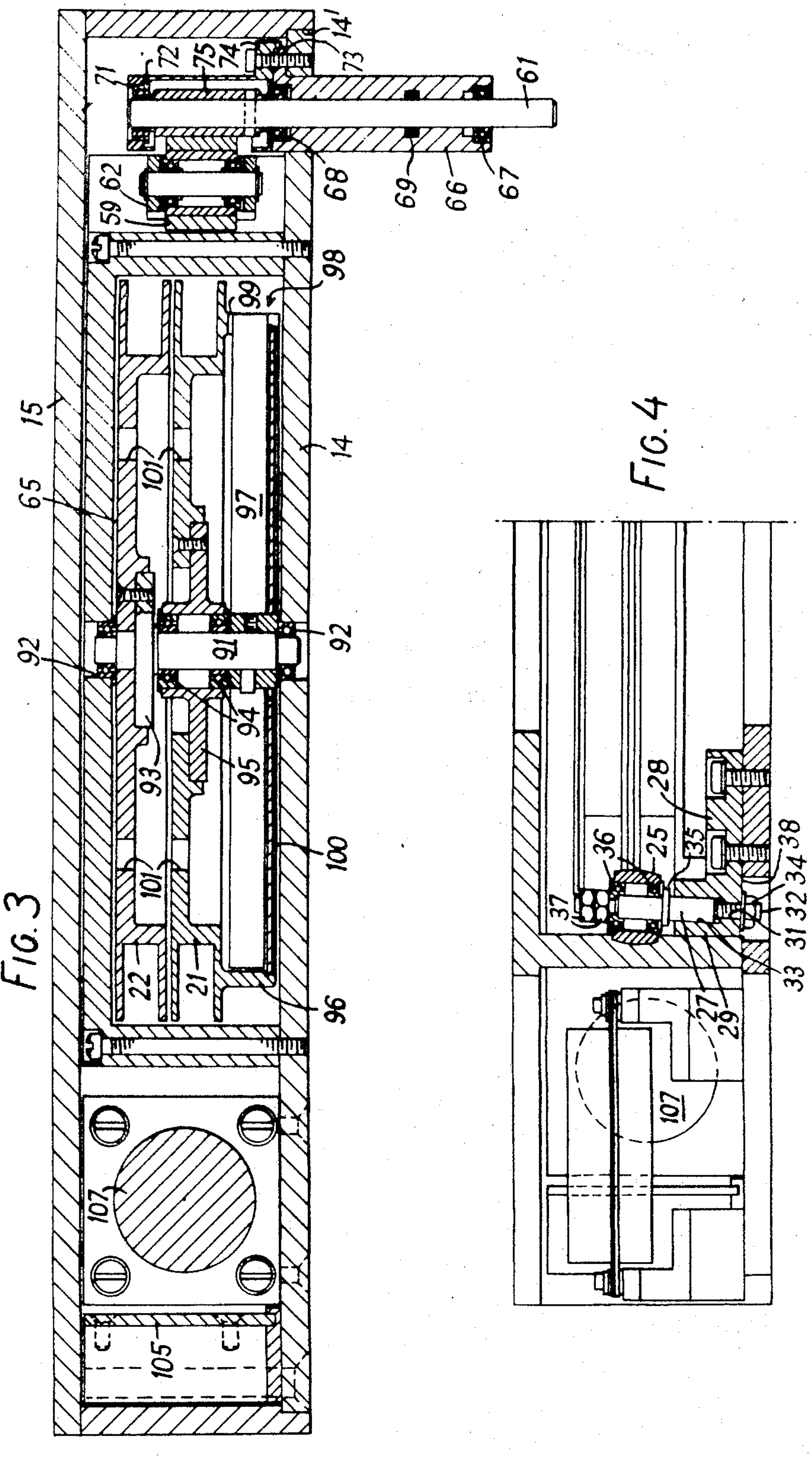
FIG. 3 is a section on line III—III of FIG. 2.
FIG. 4 is a section on line IV—IV of FIG. 2.

The spools 21 and 22 are mounted for rotation on a shaft 91 (FIG. 3) journalled in two bearings 92 and having a flange 93 by which the spool 22 is fixed to it. The spool 21 is rotatable relative to the shaft 91 on two bearings 94 via a hub 95, and has an integral depending skirt 96. Within the skirt 96 there is provided a coiled spring 97 having one end attached to the shaft 91 with the other being hooked at 98 to engage an aperture 99 in the skirt. A cover plate 100, of a material having a high melting point, closes the skirt 96 and prevents the spring 97 from "bellying". Each of the spools 21, 22 is provided with a series of apertures 101 and on assembly the tape 23 is wound onto the spool 21 and spool 22 then rotated by hand to wind up the spring 97. A spike or rod (not shown) is then passed through any pair of aligned apertures 101 to hold the spools stationary while the free end of the tape 23 is secured to the spool 22. Once this has been done, the spike is removed and the tape is ready for recording or reading purposes, the spring 97 maintaining the desired tension therein.

Each end of the tape 23 is provided on the non-oxide surface with an aluminium strip (not shown) which serves to short two gold brushes 102 (only one of which is shown in FIG. 2) mounted on a nylon peg 103 in a baseplate 104 for the heads 41 and 42. When shorting occurs, a signal is initiated which serves to reverse the drive to the pinch roller 59 and hence reverse the direction of movement of the tape 23. Circuit boards 105 providing a preamplifier, for the monitor head signals only, are mounted on the base 14 of the tape deck 5.

Figure 7:
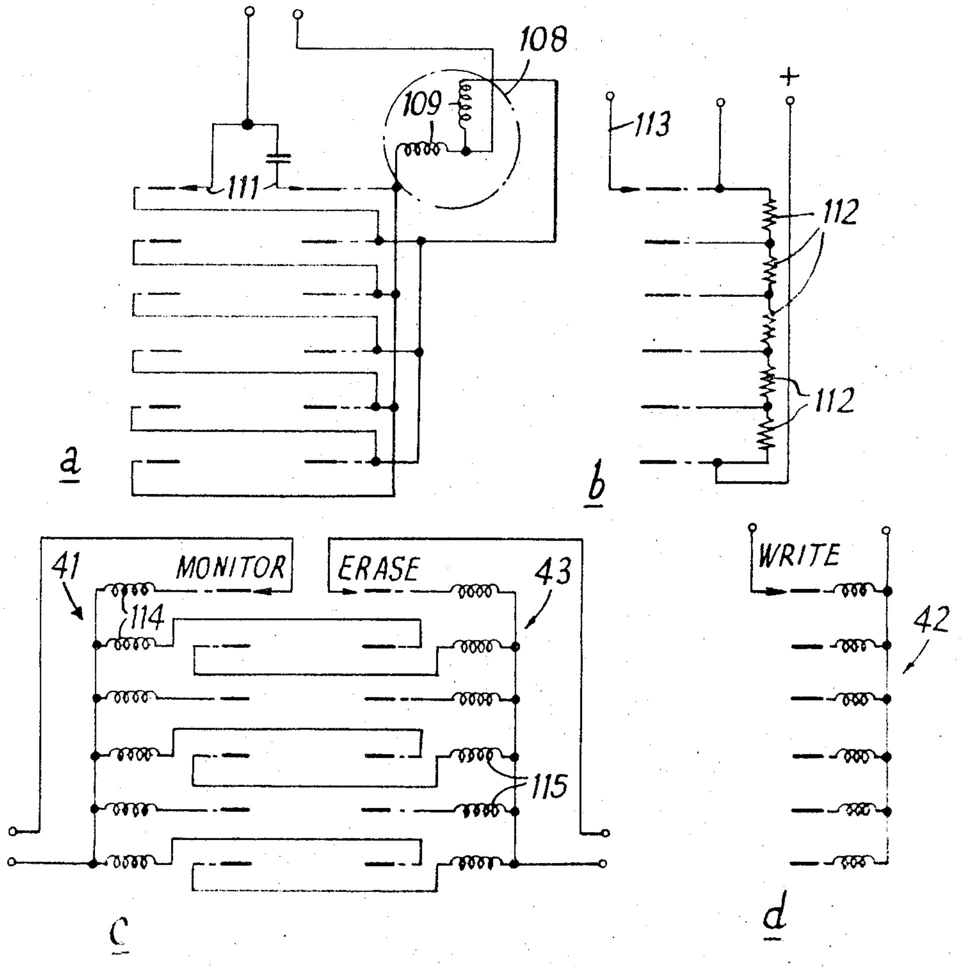
FIG. 7 is a diagrammatic representation of part of FIG. 2.

The switching of the heads 41, 42, 43 and the tape reversal is controlled by a Ledex switch 107 mounted on the tape deck 5. This is a rotary multiwafer-type swtich and it is indexed from one position to another by the signal taken from the brushes 102 when they are shorted by the aluminium strip provided at each end of the tape 23. The switch 107 has in fact four wafers and six positions, the four wafers being shown diagrammatically at *a*, *b*, *c*, and *d*, respectively, of FIG. 7.

Wafer a controls the reversal of a motor 108 of the drive means 2. The motor windings are shown at 109 in FIG. 7 and it will be seen that the connections thereto are such that the direction of current flow through the windings is reversed each time the wipers 111 are indexed from one position to the next. Wafer *b* is provided with a potentiometric device by which it is known the track on which recording is being effected at any given instant. A resistance 112 is connected between each of the six switch positions and as the wiper 113 moves from one position to another a further resistance 112 is brought into operation or taken out of operation according to the movement of the wiper. Thus the output taken from the wiper 113 is proportional to the number of resistances 112 in circuit and hence an analogue indication of track number is provided.

As already mentioned, the heads 41 and 43 are alternately employed as erase and monitor heads according to the direction of movement of the tape 23. Wafer *c* controls the switching of these heads from one mode to the other. The six individual heads of the head blocks 41 and 43 are indicated at 114 and 115, respectively, in FIG. 7 and ti will be seen it in the position shown the first head of block 41 is in the MONITOR mode while the first head of the block 43 is in the ERASE mode. When the switch 107 is indexed to the next position, the second head of block 41 is in the ERASE mode and the second head of block 43 in the MONITOR mode whereby the order of presentation of heads as seen by the tape 23 is always ERASE, WRITE, MONITOR. The heads of block 42 are always required to be in the WRITE mode and wafer *d* is wired accordingly.

The drive means 2 for the tape 23 comprises the motor 108 which drives a belt 116 around three pulleys 117, 118 and 119, the first two of which are fixed and the third of which is mounted on one end of a centrally pivoted beam 121. The other end of the beam 121 is shaped so as to counterbalance the weight of the pulley 119. When the recorder unit 1 is correctly positioned in the housing 9, the pulley 76 on the unit engages that part of the belt 116 at the time extending between the pulleys 118 and 119, the pulley 119 moving generally downwardly about the beam pivot as the pulley 76 engages the belt, and moves to its final position generally in line with the pulleys 118 and 119 as shown in broken lines in FIG. 1. On removal of the unit 1 from the system, the mechanical and electrical connections are broken and the pulley 119 is swung to its original position by the action of a spring (not shown) so that belt tension is maintained.

Figure 8:
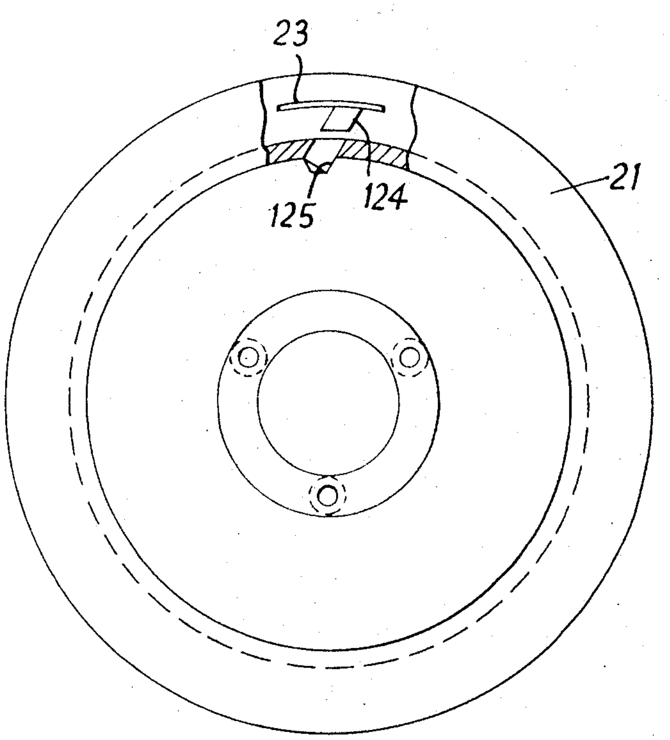
FIG. 8 is a detail of FIG. 2.

FIG. 8 shows the manner in which the tape 23 is attached to each of the spools 21, 22. A rod 124 is fastened to the appropriate end of the tape 23 and is arranged to be inclined to an axis normal to the plane of the tape at that point and away from the end of the tape. The rod 124 engages a complementary aperture 125 in the spool and thus attachment or detachment of the tape is a simple matter.

As the Ledex switch 107 and the heads 41, 42, 43 are at opposite ends of the tape deck 5, it is necessary for the interconnecting wiring to extend across the deck. The wiring has to be electrically screened to avoid the pick up of interference signals or "noise" and it has been found convenient to enclose the individually-screened wires in metal tubes 126, 127 which also act to some extent as further screens. The wiring from the heads 41 and 42 is taken through the tube 126, and the wiring from the head 43 through the tube 127, the tubes passing over the spool 22 on respective sides of the strap 65. In order to allow easy assembly and withdrawal of the spools 21 and 22, the tubes 126 and 127 are each mounted on a pair of brackets 128, 129 and 131, 132, respectively, which are bolted to the tape deck base 14. Release of one or both brackets enables each tube 126, 127 to be pushed aside sufficiently far to allow withdrawal or assembly of the spools 21 and 22, the wiring being of a length to permit this movement.

The recorder unit 1 described is of simple yet robust construction and is very readily removed from the system. This is important when recorded data relating to engine parameters or other maintenance information is required to be read during say turn-around of an aircraft where time is at a premium. The unit 1 also meets the stringent survival requirements and is adequately heat-insulated and fluid-sealed.

Furthermore, the apparatus has versatility in that it may be adapted to meet varying user requirements regarding data capacity. The apparatus may be required to record say a hundred different parameters with the facility of reading the last 2 or 3 hours of recorded data, or a smaller number of parameters with the facility of having available the last 25 hours of recorded data. By appropriate changes in the speed of the tape 23, these differing requirements can be met over a considerable range, utilising a given length of tape. Also, the apparatus can be adapted to give digital recording on any three tracks and audio recording on the other three, for example.

Thus the invention is applicable to a recorder to be used for maintenance purposes where engine and other parameters are recorded and can be used to anticipate or diagnose engine or other failures. The easy removal of the recorder unit and the facility of having fast replay by virtue of the external drive are considerable advantages afforded by the invention irrespective of whether it is applied to a maintenance or "crash" recorder.

I claim:

1. A flight data acquisition and recording system for use in aircraft comprising a recorder unit including a substantially sealed casing and a tape deck mounted in said casing, a remaining portion of said system fixed in said aircraft and located externally of said casing of said recorder unit, said recorder unit being detachable from said remaining portion of said system, and drive means for said tape deck including in said remaining portion of said system and located externally of said recorder unit, said drive means being disconnectible from said tape deck when said recorder unit is detached from said remaining portion of said system, said drive means comprising a belt and a motor operable to drive said belt, said recorder unit further including a tape drive shaft extending through said casing to said tape deck and a pulley attached to said drive shaft outside of said casing for engagement with said belt when said recorder unit is correctly positioned in said remaining portion of said system.

2. A system according to claim 1 wherein said drive means further includes a plurality of pulleys around which said belt extends, an arm on which one of said pulleys is mounted, said arm being pivoted for motion in one direction on engagement of said pulley on said recorder unit with said belt and in the opposite direction on disengagement thereof, whereby tension is maintained in said belt to prevent it disengaging one or more of said plurality of pulleys.

3. A system according to claim 2 wherein said drive means further includes counterbalancing means on said arm for minimizing spasmodic fluctuations in the drive from said motor.

4. A system according to claim 2 wherein said drive shaft includes a material for expanding at unusually high temperatures thereby sealing said casing of said unit.

5. A system according to claim 1 wherein said recorder unit comprises two rotatable spools mounted on said tape deck coaxially with respect to each other for alternately receiving and relinquishing a recyclable length of magnetic tape, and guide means for guiding said tape from one said spool to the other and vice versa maintaining the plane of the surface of said tape at any point thereof substantially parallel with the axis of rotation of said spools.

6. A system according to claim 5 wherein at least one of said spools has an aperture therein, and said magnetic tape has a member which projects therefrom, said tape being connectible to said spool by said member being inserted in said aperture.

7. A system according to claim 5 further including a coiled spring coupled between said two rotatable spools for maintaining tension in said magnetic tape.

8. A system according to claim 5 wherein said guide means comprises a plurality of rollers mounted on said tape deck for guiding said tape from one said spool to the other said spool, at least two of said rollers being non-cylindrical, the axes of rotation of said non-cylindrical rollers being inclined with respect to the base of said tape deck.

9. A unit according to claim 8 wherein each said non-cylindrical roller is of barrel form having a surface at least part of which is composed of a material of relatively high coefficient of friction and/or low coefficient of thermal conductivity.

10. A unit according to claim 9 wherein said surface of each said barrel roller includes a peripheral recess therein, each said barrel roller including an O-ring composed of said material located in said peripheral recess.

* * * * *